United States Patent
Keesen

(10) Patent No.: US 8,054,887 B2
(45) Date of Patent: Nov. 8, 2011

(54) METHOD AND APPARATUS FOR ENCODING A PICTURE SEQUENCE USING PREDICTED AND NON-PREDICTED PICTURES WHICH EACH INCLUDE MULTIPLE MACROBLOCKS

(75) Inventor: Heinz-Werner Keesen, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1330 days.

(21) Appl. No.: 11/547,373

(22) PCT Filed: Jan. 22, 2005

(86) PCT No.: PCT/EP2005/000605
§ 371 (c)(1),
(2), (4) Date: Oct. 3, 2006

(87) PCT Pub. No.: WO2005/098755
PCT Pub. Date: Oct. 20, 2005

(65) Prior Publication Data
US 2008/0285649 A1 Nov. 20, 2008

(30) Foreign Application Priority Data
Apr. 7, 2004 (EP) .................................. 04090138

(51) Int. Cl.
*H04N 7/12* (2006.01)
*H04N 11/02* (2006.01)
*H04N 11/04* (2006.01)
(52) U.S. Cl. .......... 375/240.24; 375/240.01; 375/240.12
(58) Field of Classification Search .................. None
See application file for complete search history.

(56) References Cited

U.S. PATENT DOCUMENTS
4,827,338 A * 5/1989 Gerard ..................... 375/240.18
(Continued)

FOREIGN PATENT DOCUMENTS
EP 0485798 5/1992
(Continued)

OTHER PUBLICATIONS

D.J. Le Gall: "MPEG Video: Overview of the Compression Algorithm" SID International Symposium Digest of Technical Papers, Anaheim, May 6-10, 1991, vol. 22, May 6, 1991, pp. 513-516.
Search A Report Dated Jul. 25, 2005.

*Primary Examiner* — Joseph Ustaris
*Assistant Examiner* — Kevin McInnish
(74) *Attorney, Agent, or Firm* — Robert D. Shedd; Paul P. Kiel; Brian J. Dorini

(57) ABSTRACT

In MPEG, most video frames are encoded in inter mode. Every now and than a video frame is encoded in intra mode in order to limit error propagation and to enable access points for starting decoding of the video sequence. According to the invention, however, it is sufficient to encode in an intra frame only those pixel blocks in intra mode of which at least one pixel is used for predicting some future picture content information, whereas the other blocks can be encoded in inter mode. In order to check which blocks in the intra frame can be encoded in inter mode, a motion compensation pre-analysis of the following P-frame is performed, in order to find those blocks that need not be encoded in intra mode because no pixel in such blocks is used for the prediction of that following P-picture.

8 Claims, 2 Drawing Sheets

U.S. PATENT DOCUMENTS

Figure 1:
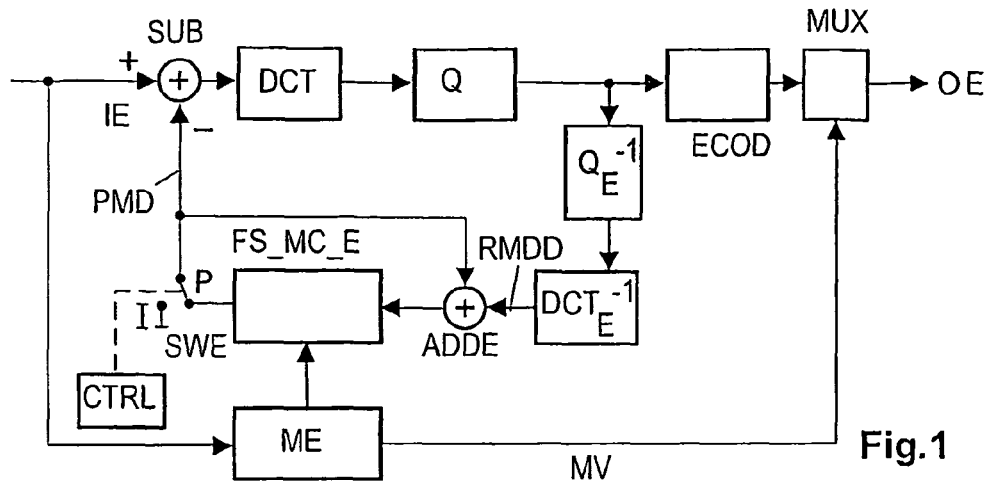

| | | | |
|---|---|---|---|
| 5,825,425 A * | 10/1998 | Kazui et al. | 375/240.24 |
| 6,259,736 B1 | 7/2001 | Chujoh et al. | |
| 6,310,915 B1 * | 10/2001 | Wells et al. | 375/240.03 |
| 6,556,718 B1 * | 4/2003 | Piccinelli et al. | 382/236 |
| 6,731,684 B1 * | 5/2004 | Wu | 375/240.12 |
| 6,920,175 B2 * | 7/2005 | Karczewicz et al. | 375/240.03 |
| 2005/0226318 A1 * | 10/2005 | Shepherd et al. | 375/240.01 |

FOREIGN PATENT DOCUMENTS

| | | |
|---|---|---|
| EP | 0933948 | 8/1999 |
| JP | 62-91091 | 4/1987 |
| JP | 11-220733 | 8/1999 |

* cited by examiner

METHOD AND APPARATUS FOR ENCODING A PICTURE SEQUENCE USING PREDICTED AND NON-PREDICTED PICTURES WHICH EACH INCLUDE MULTIPLE MACROBLOCKS

This application claims the benefit, under 35 U.S.C. §365 of International Application PCT/EP05/000605, filed Jan. 22, 2005, which was published in accordance with PCT Article 21(2) on Oct. 20, 2005 in English and which claims the benefit of European patent application No. 04090138.1, filed Apr. 7, 2004.

The invention relates to a method and to an apparatus for encoding a picture sequence using predicted and non-predicted pictures which each include multiple pixel macroblocks, in particular encoding pixel macroblocks in non-predicted pictures.

BACKGROUND

In known video compression systems, e.g. in MPEG, most video frames or fields are encoded in an inter-frame or inter-field mode by using e.g. discrete cosine transform (DCT) coding. To increase coding/decoding efficiency, in some video compression systems intra frame prediction is used, see MPEG-4 AVC for example.

In many video compression systems, e.g. in MPEG, every now and than a video frame is encoded in an intra-frame mode, for instance the first frame of a GOP (group of pictures) in MPEG. A GOP normally contains intra, inter or predicted, and bi-directionally predicted (I, P, B) pictures. The pictures are divided into e.g. 8*8 luminance pixel blocks or into 16*16 luminance pixel macroblocks to each of which corresponding chrominance-pixel blocks are assigned. A macroblock may represent a set of four 8*8 luminance blocks and two related 8*8 chrominance blocks. In such case the coding and the decoding is based on macroblocks and blocks.

INVENTION

Although intra mode (or non-predicted mode) encoded pictures in most cases require more bits for encoding than inter-frame or inter-field encoded pictures, it is generally assumed that intra-coded frames are needed to allow for access points in the video sequence, and to limit e.g. channel error propagation.

A problem to be solved by the invention is to save part of the additional bits required for intra frame encoding in a video sequence, thereby still providing access points to the video sequence and still limiting error propagation. This problem is solved by the method disclosed in claim 1. An apparatus that utilises this method is disclosed in claim 3.

According to the invention, in order to limit error propagation and to enable access points or entries for starting decoding of the video sequence, it is sufficient to encode in an intra frame only those pixel blocks, pixel macroblocks or other specified pixel regions in an intra mode of which at least one pixel is used for predicting some future picture content information, whereas the other pixel blocks, pixel macroblocks and/or specified pixel regions can be encoded in inter-frame or inter-field prediction mode.

In order to check which blocks or macroblocks in an intra-frame can be encoded in inter mode, a motion compensation pre-analysis of the next following P-frame (=inter frame) or P-field (=inter field) is performed, in order to find those blocks that need not be encoded in intra mode because no pixel in such blocks is used for the prediction of that following P-picture.

Blocks, macroblocks or other specified pixel regions in an I frame or field that are just used for constructing predicted macroblocks in the next following B-frame or B-field can be encoded in inter mode as well.

The advantage of the inventive processing is higher compression efficiency that is achieved by higher encoder complexity.

In principle, the inventive method is suited for encoding a picture sequence using predicted and non-predicted frames or fields which each include multiple pixel blocks, pixel macroblocks or other specified pixel regions, including the steps:
encoding said picture sequence, thereby
determining whether or not all pixels in a current block or macroblock in a non-predicted frame or field are used for predicting a corresponding block or macroblock in a next following predicted frame or field, which corresponding block or macroblock is displaced according to motion in the picture content of said picture sequence, wherein
if said predicted block or macroblock has at least one pixel in common with said current block or macroblock, encoding said current block or macroblock in a non-predicted mode;
if said predicted block or macroblock has no pixel in common with said current block or macroblock, encoding said current block or macroblock in a predicted mode.

In principle the inventive apparatus is suited for encoding a picture sequence using predicted and non-predicted frames or fields which each include multiple pixel blocks, pixel macroblocks or other specified pixel regions, said apparatus including:
means for encoding said picture sequence;
means for determining whether or not all pixels in a current block or macroblock in a non-predicted frame or field are used for predicting a corresponding block or macroblock in a next following predicted frame or field, which corresponding block or macroblock is displaced according to motion in the picture content of said picture sequence, wherein,
if said predicted block or macroblock has at least one pixel in common with said current block or macroblock, said current block or macroblock is encoded in a non-predicted mode;
if said predicted block or macroblock has no pixel in common with said current block or macroblock, said current block or macroblock is encoded in a predicted mode.

Advantageous additional embodiments of the invention are disclosed in the respective dependent claims.

DRAWINGS

Figure 2:
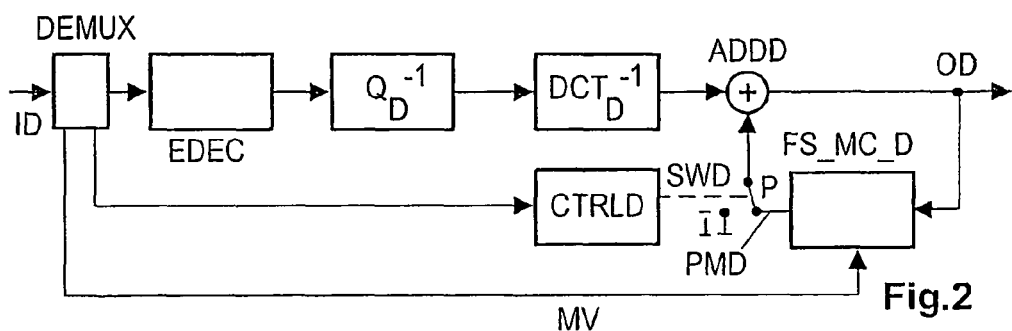
Figure 3:
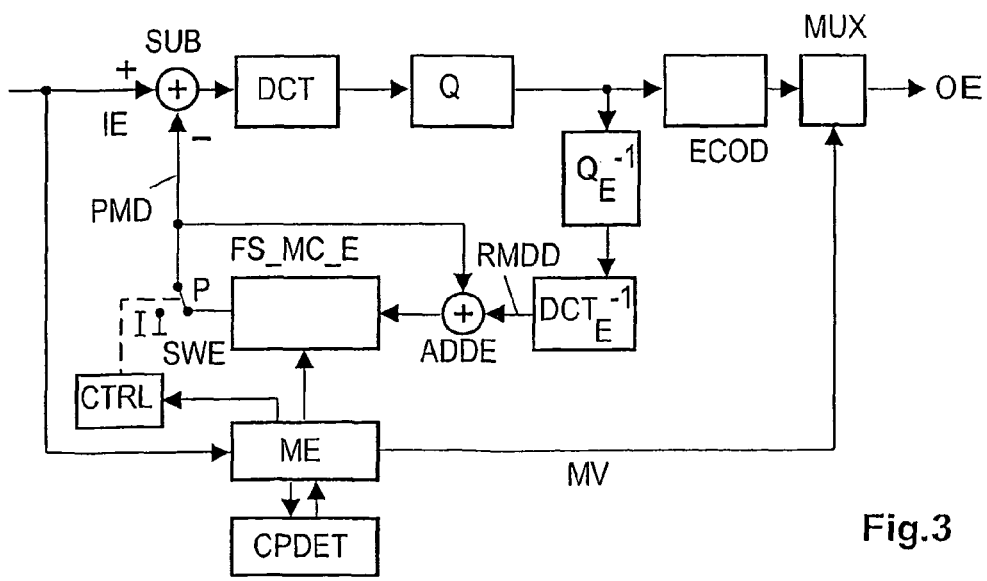
Figure 4:
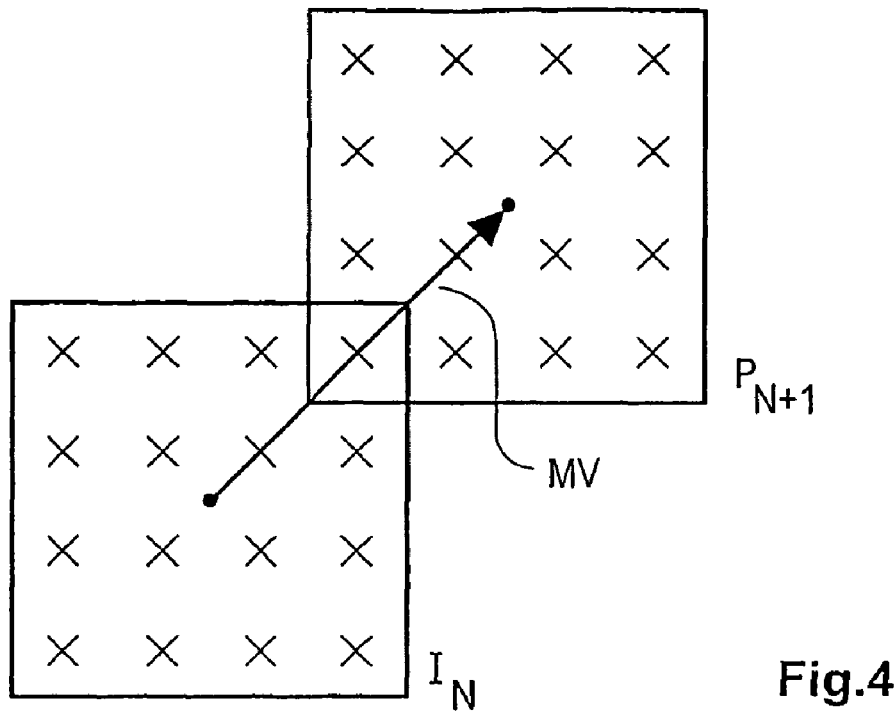
Figure 5:
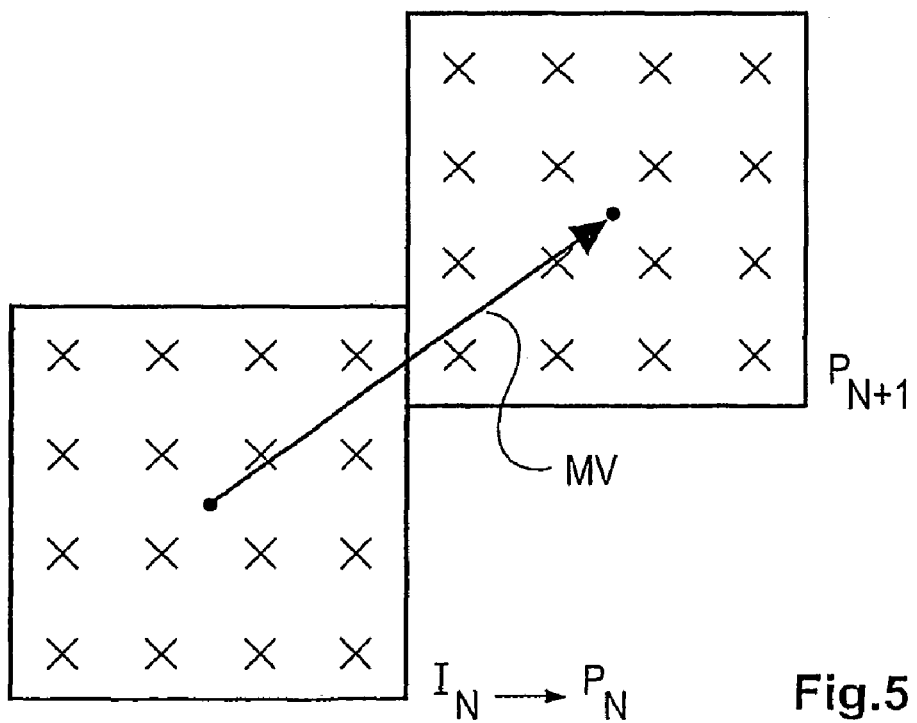

Exemplary embodiments of the invention are described with reference to the accompanying drawings, which show in:
FIG. 1 known encoder for video data;
FIG. 2 known decoder for video data;
FIG. 3 inventive encoder for video data;
FIG. 4 predicted pixel block having a pixel in common with the reference pixel block;
FIG. 5 predicted pixel block having no pixel in common with the reference pixel block.

EXEMPLARY EMBODIMENTS

In FIG. 1 the video data input signal IE of the encoder contains 16*16 macroblock data for encoding. In case of video data to be intraframe coded they pass a subtractor SUB unmodified, the switch SWE is in position 'I'. Thereafter the 8*8 blocks of the macroblocks are processed in discrete cosine transform means DCT and in quantising means Q, and are fed via an entropy encoder ECOD to a multiplexer MUX which outputs the encoder video data output signal OE. Entropy encoder ECOD can carry out Huffman coding for the quantised DCT coefficients. In the multiplexer MUX header information and motion vector data MV and possibly encoded audio data are combined with the encoded video data.

In case of interframe video data, switch SWE is in position 'P' and predicted macroblock data PMD are subtracted on a block basis from the input signal IE in subtractor SUB, and 8*8 block difference data are fed via transform means DCT and quantising means Q to the entropy encoder ECOD. The output signal of quantising means Q is also processed in corresponding inverse quantising means $Q_E^{-1}$, the output signal of which is fed via corresponding inverse discrete cosine transform means $DCT_E^{-1}$ to the combiner ADDE in the form of reconstructed block or macroblock difference data RMDD. The output signal of ADDE is buffer-stored in a picture store in motion estimation and compensation means FS_MC_E, which carry out motion compensation for reconstructed macroblock data and output correspondingly predicted macroblock data PMD to the subtracting input of SUB and to the other input of the combiner ADDE.

The characteristics of the quantising means Q and the inverse quantising means $Q_E^{-1}$ are controlled by the occupancy level of an encoder buffer in entropy encoder ECOD. Switch SWE is controlled by a controller CTRL e.g. according to the MPEG GOP structure, which controller may also control other units in the encoder.

A motion estimator ME receives the input signal IE and provides motion estimation and compensation means FS_MC_E with the necessary motion information and multiplexer MUX with motion vector data MV.

$Q_E^{-1}$, $DCT_E^{-1}$, ADDE and FS_MC_E constitute a simulation of the receiver-end decoder, which is described in connection with FIG. 2.

In FIG. 2 the encoded video data input signal ID is fed via a demultiplexer DEMUX, entropy decoder means EDEC, inverse quantising means $Q_D^{-1}$ and inverse discrete cosine transform means $DCT_D^{-1}$ to a combiner ADDD, which outputs the video data output signal OD. EDEC can carry out e.g. Huffman decoding for the Huffman encoded and quantised coefficients. Demultiplexer DEMUX separates header information, encoded video data, picture type data and motion vector data MV. $Q_D^{-1}$ and $DCT_D^{-1}$ and EDEC have a function which is the corresponding inverse of the functions of Q, DCT and ECOD in the encoder of FIG. 1. The output signal of ADDD is buffer-stored in a picture store in motion compensation means FS_MC_D. FS_MC_D effects a motion compensation for reconstructed macroblock data according to the motion vector data MV, and output in case of P pictures correspondingly predicted block or macroblock data PMD via switch SWD to the other input of adder-ADDD in which in case of 'P' pictures the predicted data are combined on a block basis with the received block difference data. Switch SWD is controlled by a controller CTRLD which receives picture type data from demultiplexer DEMUX. In case of I or intra mode frames no predicted picture data are fed to the second input of adder ADDD.

In the inventive encoder in FIG. 3 all functional blocks or units basically carry out the same operations like in the corresponding functional blocks or units in FIG. 1. However, the motion estimator ME is additionally controlled by a common block or macroblock pixel detector CPDET, which in addition determines whether or not a predicted block or a predicted macroblock in a following P frame or field has at least one luminance (or chrominance) pixel in common with the I (or intra mode) frame reference block or macroblock on which the prediction is based. If there is no such common pixel the corresponding block or macroblock in the I frame is encoded in P (or inter) mode instead. CPDET or ME send a corresponding information to controller CTRL such that switch SWE is switched from 'I' position to 'P' position during processing for this block or macroblock.

In FIG. 4 a reference pixel block '$I_N$' of an I frame is depicted together with a therefrom predicted pixel block '$P_{N+1}$' of a following P frame. The amount and the direction of the block displacement is represented by motion vector MV. Block $P_{N+1}$ has one pixel in common with block $I_N$. Because pixel information from block $I_N$ is required for predicting block $P_{N+1}$, block $I_N$ is kept and encoded and decoded as an I block.

In FIG. 5 a reference pixel block '$I_N$' of an I frame is depicted together with a therefrom predicted pixel block '$P_{N+1}$' of a following P frame. The amount and the direction of the block displacement is represented by motion vector MV. Block $P_{N+1}$ has no pixel in common with block $I_N$. Because no pixel information from block $I_N$ is required for predicting block $P_{N+1}$, block $I_N$ is encoded and decoded as a P block.

For simplified presentation in the both figures the blocks have 4*4 pixels only instead of 8*8 pixels.

When the decoder starts decoding an encoded picture at an I frame the I frame blocks or macroblocks having been previously encoded as P blocks or macroblocks can not be decoded because of the missing reference block or macroblock information. However, when arriving at the following P frame all blocks or macroblocks are correctly reconstructed with no information missing. Because the time period between the initial I frame and the following P frame is e.g. three frames or 3*40 ms=120 ms only, a viewer of the reconstructed video sequence will not be annoyed when starting reception or replay.

The invention can be used for example in the broadcast of digital television signals or in the transmission of digital video signals, in networks such as the Internet, in a videophone or when recording optical or magnetic storage media, e.g. DVD or BD, in MPEG-1, MPEG-2 and MPEG-4 and other video coding/decoding systems.

The invention claimed is:

1. Method for encoding a picture sequence using predicted and non-predicted frames or fields which each include multiple pixel blocks, pixel macroblocks or other specified pixel regions, comprising the steps:

encoding said picture sequence, thereby determining whether or not all pixels in a current block or macroblock in a non-predicted frame or field are used for predicting a corresponding block or macroblock in a next following predicted frame or field, which corresponding block or macroblock is displaced according to motion in the picture content of said picture sequence, wherein if said predicted block or macroblock has at least one pixel in common with said current block or macroblock, encoding said current block or macroblock in a non-predicted mode;

if said predicted block or macroblock has no pixel in common with said current block or macroblock, encoding said current block or macroblock in a predicted mode.

2. Method according to claim 1, wherein said determining step is a motion compensation pre-analysis step.

3. Method according to claim 1, wherein said encoding is an MPEG encoding and said predicted frames or fields are of P type and said non-predicted frames or fields are of I type.

4. Method according to claim 3, wherein macroblocks in an I frame or field that are just used for constructing predicted macroblocks in the next following B-frame or B-field are encoded in P mode, too.

5. Method according to claim 1, wherein said pixel blocks, pixel macroblocks or other specified pixel regions contain luminance pixels.

6. Method according to claim 1, wherein said pixel blocks, pixel macroblocks or other specified pixel regions contain chrominance pixels.

7. Apparatus for encoding a picture sequence using predicted and non-predicted frames or fields which each include multiple pixel blocks, pixel macroblocks or other specified pixel regions, said apparatus including:

means for encoding said picture sequence;

means for determining whether or not all pixels in a current block or macroblock in a non-predicted frame or field are used for predicting a corresponding block or macroblock in a next following predicted frame or field, which corresponding block or macroblock is displaced according to motion in the picture content of said picture sequence, wherein, if said predicted block or macroblock has at least one pixel in common with said current block or macroblock, said current block or macroblock is encoded in a non-predicted mode;

if said predicted block or macroblock has no pixel in common with said current block or macroblock, said current block or macroblock is encoded in a predicted mode.

8. Apparatus according to claim 7, wherein said determining means are motion compensation pre-analysis means.

* * * * *